United States Patent [19]

Haimer

[11] Patent Number: 5,728,447
[45] Date of Patent: Mar. 17, 1998

[54] PRESSED BODY PREPARED FROM PLANT MATERIAL BY PELLETIZATION AND DEVICE FOR PREPARING SAME

[76] Inventor: Franz Haimer, Weiherstrasse 21, 86568 Hollenbach, Germany

[21] Appl. No.: 591,637

[22] PCT Filed: Jun. 21, 1994

[86] PCT No.: PCT/EP94/02015

§ 371 Date: Jan. 19, 1996

§ 102(e) Date: Jan. 19, 1996

[87] PCT Pub. No.: WO95/03165

PCT Pub. Date: Feb. 20, 1995

[30] Foreign Application Priority Data

Jul. 20, 1993 [DE] Germany .......................... 93 10 760 U
Feb. 8, 1994 [DE] Germany .......................... 94 02 091 U

[51] Int. Cl.[6] ........................... B32B 3/28; B32B 5/12
[52] U.S. Cl. ................. 428/182; 428/105; 428/113; 428/156; 428/170; 428/171; 428/192; 428/218
[58] Field of Search ...................... 428/182, 192, 428/212, 105, 113, 156, 170, 171, 218; 264/142, 144

[56] References Cited

U.S. PATENT DOCUMENTS

| | | | |
|---|---|---|---|
| 2,689,811 | 9/1954 | Frederick et al. | 428/182 |
| 3,613,335 | 10/1971 | Forth | 56/1 |
| 4,342,807 | 8/1982 | Rasen et al. | 428/182 |
| 4,546,027 | 10/1985 | Holvoet et al. | 428/182 |
| 4,824,352 | 4/1989 | Hadley et al. | 425/168 |

FOREIGN PATENT DOCUMENTS

| | | |
|---|---|---|
| 599421 | 6/1934 | Germany . |
| 1 211 845 | 3/1966 | Germany . |
| 9309739 | 9/1993 | Germany . |
| 42 14 111 A1 | 11/1993 | Germany . |
| 426 238 | 12/1966 | Switzerland . |

OTHER PUBLICATIONS

Author: Dr.-Ing. W. Pietsch Leingarten-Heilbronn a. N., Title: Die Bedeutung der Walzenkonstruktion von Brikettier-, Kompaktier-und Pelletiermaschinen fürihre technische Anwendung*. Textbook in: Aufbereitungs-Technik vol. 11, 1970 - No. 3.
International Recherchenbehörde Search Report dated Jun. 6, 1994.
International Preliminary Examination Report dated May 12, 1995.

*Primary Examiner*—Donald Loney
*Attorney, Agent, or Firm*—McGlew and Tuttle

[57] ABSTRACT

The present invention pertains to the problem of compressing biomass, e.g., ripe grain or cereals, into solid pressed bodies 1, which are suitable for use as fuel, despite differences in the harvesting conditions, and whose strength no longer depends on the moisture content in the biomass. It was found that this problem can be solved without an essential expense by imparting a wavy structure 6 to the pressed body 1. As a result, the outer surface of the pressed body 1 is compressed more strongly by the extrusion than is the middle cross section area, in which long-fibered parts of the mass are readily oriented in a wave shape 21 and lead to elasticity of the pressed bodies 1, which is favorable for handling.

20 Claims, 5 Drawing Sheets

PRESSED BODY PREPARED FROM PLANT MATERIAL BY PELLETIZATION AND DEVICE FOR PREPARING SAME

FIELD OF THE INVENTION

The present invention pertains in general to a pressed body prepared from plant material by pelletization, as well as to a device for preparing same. In particular the present invention relates to a particular shape of the pressed body and how to form that shape.

BACKGROUND OF THE INVENTION

A pelletizing press for processing coarse and long fibers, especially straw, into animal fodder has been known from U.S. Pat. No. 4,824,352. The material is fed via a screw conveyor into an expanding funnel, which is arranged in the intake wedge of two gear-driven hollow rolls, which engage each other in the manner of toothed gears. A plurality of radially tapering holes lead from the tooth bottom into the interior space of the hollow rolls. The stalk material fed into the wedge area of the hollow rolls is compressed or shorn off by the teeth dipping into the tooth spaces, and the stalk material is pressed through the radial holes into strands, which break off in the hollow space of the hollow rolls and are axially removed from the hollow spaces.

The cross section of these strands corresponds to the cross section of the holes. These have either a circular or polygonal cross section. The problem of this prior-art pelletizing device is that a blocking back-up of the material to be pressed develops between the teeth dipping into each other, because of counterpressing surfaces formed between the holes. The material to be pressed is backed up on these counter pressing surfaces.

SUMMARY AND OBJECTS OF THE INVENTION

In contrast, the present invention uses a different principle of operation related to WO 93/22132 which was not previously published. According to the present invention the harvested and chopped biomass, especially grain, hay, etc., is fed into a pelletizing press, which consists of rotation bodies engaging one another in the manner of toothed gears, and whose teeth form shaft-like, continuous pressing channels, contrary to the state of the art. The teeth are consequently formed as webs, which extend considerably longer in the radial direction than to teeth of normal toothed gears. The outer areas of the webs engaging each other deliver the material introduced into the wedge area of the rotation bodies into the spaces located between the webs of the other rotation body with a relatively small depth of penetration, after which the material moves radially inwardly through pressing channels, while being compressed, along the pressing channels designed as shafts, until the material is discharged into the interior hollow space of the individual rotation body and is broken off there.

The pressed bodies prepared in this manner have the shape of a right parallelepiped or board with a relatively small wall thickness, which corresponds to the internal diameter of the pressing channels.

It was now found that the strength of the pressed bodies thus prepared depends to a considerable extent on the moisture content in the pressed material. The higher the moisture content in the pressed material, the lower is the strength of the pressed body. Consequently, the present invention seeks to make it possible to prepare pressed bodies whose strength no longer depends so strongly on the moisture content in the material to be pressed.

Based on U.S. Pat. No. 4,824,352, which is the closest state of the art, this problem is solved according to the present invention with the features of having corrugations in the brick or pressed body.

Even though it has been known from the publication Aufbereitungstechnik, Vol. 11, No. 3, March 1979, pp. 128–138, that a corrugated sheet-like structure can be imparted to a pressed body, this is not done according to a pelletization process, but by means of a roll pressure briquetting and compacting machine. This machine contains—in the jacket surfaces of two cylinders rolling on each other—depressions corresponding to the pressed body, into which a powdered material is filled and is compressed there.

Contrary to this, a plant material is compressed according to the present invention in the shape of a corrugated sheet according to a pelletization process and is broken off at right angles to the profiling.

It was found to be particularly advantageous for the wave-like profiling to have wave valleys and wave peaks extending mutually in parallel, wherein one wave valley on one side is always located opposite a wave peak on the other side of the pressed body.

In a preferred embodiment of the present invention, the pressed body has a structure resembling a corrugated sheet, in which a material of equal thickness is profiled in the manner of a corrugated sheet.

The strength of a pressed body having this shape was found to be practically independent from the nature of, and the moisture content in, the pressed material. This favorable result is of particular significance for using the pressed bodies according to the present invention as a fuel. The amount of abraded material and the risk of breakage are reduced during loading and transportation as a consequence of the strength of the pressed bodies. The losses of the harvested biomass are consequently substantially reduced. On the other hand, the pressed body according to the present invention offers an enlarged surface as a consequence of the wave-like profiling, which leads to a greatly improved calorific output if the pressed body is used as a fuel.

Rough or fibrous front surfaces extending at right angles to the profilings are formed due to the breaking off of the pressed strand. These front surfaces make it especially easy for the profilings to catch fire.

The high strength of the pressed body prepared according to the present invention is due to the fact that it has different structures over its cross section. Higher density of the pressed material can be found in the area of the wave peaks and wave valleys, whereas a slightly wavy structure of the pressed material becomes visible in the middle wall area of the pressed body. The difference in the height of this slightly wavy structure from wave peak to wave valley is substantially smaller than the corresponding difference in the height of the outer wave-like profiling. The areas of greater density ensure a great reduction in the amount of abraded material during the loading and transportation of the pressed bodies. The slightly wave-like profiling of the pressed material in the middle wall area of the pressed body causes a certain elasticity of the pressed material, which leads to a high degree of insusceptibility to breakage.

The design of a pelletizing device according to the present invention, makes it possible to prepare pressed bodies of the above-mentioned shape. First and second hollow rolls have a plurality of webs which are connected on axial ends to flange bodies. The webs form teeth of the first and second rolls and adjacent webs of each hollow roll define a pressing channel therebetween. The pressing channel extends continuously from an outer radial edge of the hollow roll to a hollow roll interior of the respective first and second rolls. The first and second hollow rolls are mounted to rotate in opposite directions and engage one another in a manner of tooth gears to compress plant material which has been fed between the first and second rolls. The engagement of the first and second rolls forces the plant material through the pressing channels into the hollow interior of the rolls. The webs have wave-like profiling on opposite lateral surfaces to cause the pressing channels to have wave-like profiling.

The hollow rolls disclosed are surrounded by a housing. The plant material to be compressed is brought into the intake wedge of the hollow rolls, and there it enters the shafts or channels between the webs, while being compressed, and moved step by step radially inwardly to enter the interior space of the individual hollow roll. The webs of the hollow rolls are heated and profiled in a defined manner, so that the plant material is compressed and cured by drying during its passage through the shafts. As soon as the plant material has reached the interior space of the individual hollow roll, it is broken off and is removed from the hollow roll in the axial direction.

It was now found that the quality of the pelletized pressed bodies depends essentially on the residence time in the shafts between the webs. The longer the residence time, the more favorable is the curing of the pressed bodies, which leads, among other things, to a reduction in the amount of abraded material during the loading and transportation of the pressed bodies. If the pressed bodies are used as fuel, the prolonged curing of the pressed bodies in the shafts causes an increase in the calorific value of the pressed bodies, but it must be borne in mind that the conditions under which the plant material is harvested are subject to climatic differences.

An additional object of the additional invention is to improve the device for pelletizing plant material, which has been known from WO 93/22132, such, that increased throughput of plant material and improved curing will be achieved without having to increase the dimensions of the pelletizing device.

Based on WO 93/22132, this object is accomplished according to the present invention by the outer walls of the webs being provided in some areas with projections, which are intended for mutually supporting adjacent webs in the axial direction.

The present invention offers the possibility of producing pressed bodies with a wave-like profiling, as was mentioned already in the introduction. Relative to the radial length of the individual pressed bodies, the material contained therein is substantially builder than in the case of a pressed body which can be obtained according to WO 93/22132 with smooth web walls. As a consequence of the wave-like profiling of the outer walls of the webs, an enlarged surface is made available to the arriving plant material for compression and curing.

However, the present invention solves the additional problem of enlarging the surface made available for the compression of the pressed bodies at the outer walls of the webs even further. For this purpose, the outer walls of the webs are provided in some areas with projections, which are intended for mutually supporting adjacent webs in the axial direction.

The webs are stabilized by these projections against deflection during their axial extension, because they mutually support each other. At the same time, a group of shafts located between the webs is brought about by the projections. The arriving plant material to be pelletized is distributed into the individual groups on the intake side. As a consequence, the plant material in the individual shaft has a longer residence time, and it can therefore be cured more intensely.

It is possible as a consequence of these advantages to increase the throughput of the plant material to be pressed per unit of time without compromising curing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
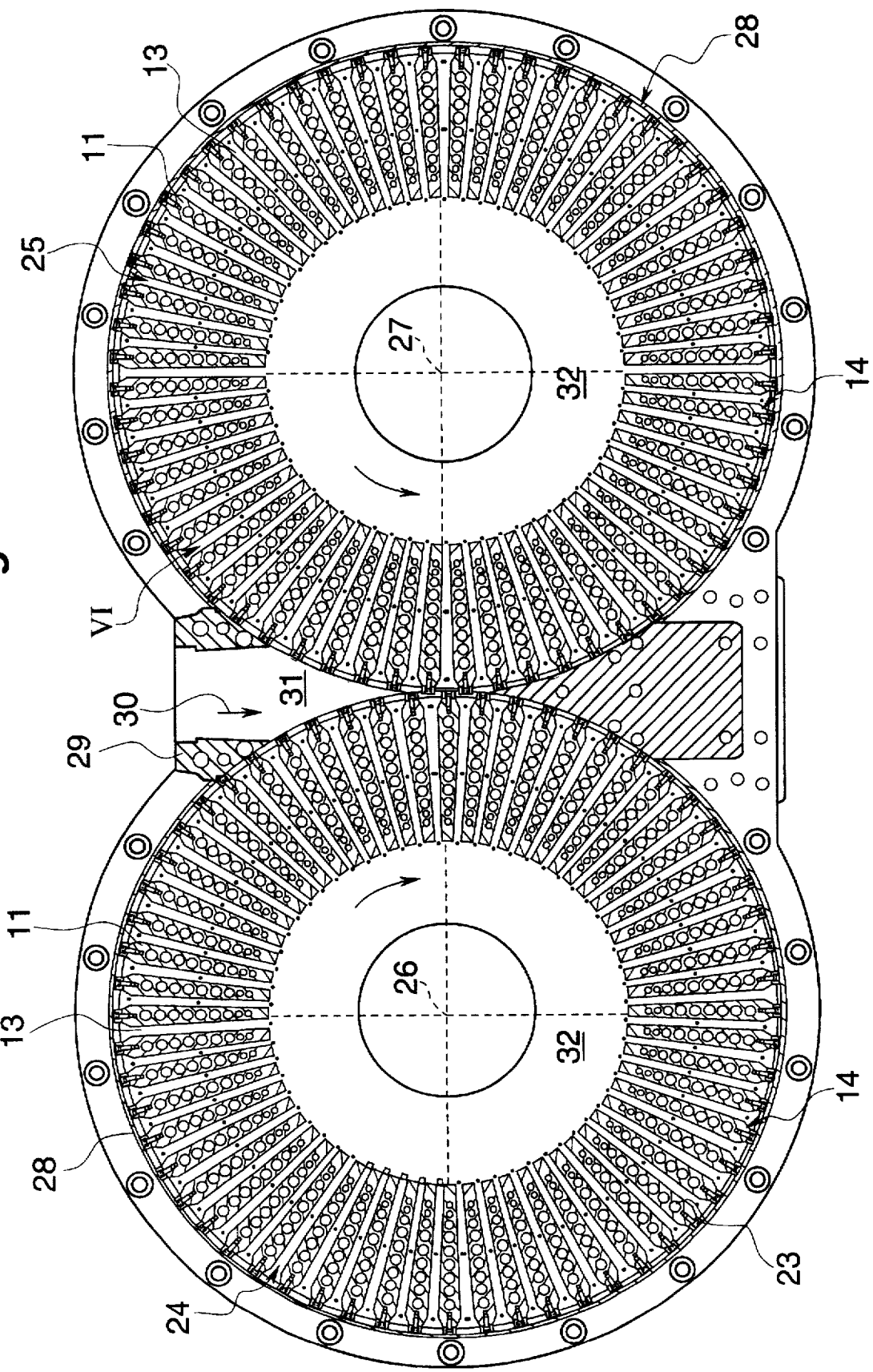
FIG. 1 is a radial cross section of a pelletizing device.

Referring to the drawings, the pelletizing device shown in FIG. 1 corresponds essentially to the prior-art arrangement according to WO 93/22132 which corresponds to U.S. patent application Ser. No. 08/285,225 and is hereby incorporated by reference. According to that arrangement, two hollow rolls 24, 25 with mutually parallel axes 26, 27 are mounted in a housing 28 in the manner of toothed gears. The individual hollow rolls 24, 25 consist of radially arranged webs 11, between which shafts 13 are located. The webs 11 are connected on the front side to flanged bodies, via which the hollow rolls 24, 25 are mounted and driven.

The plant material to be pelletized is introduced into the connection wedge 31 between the hollow rolls 24, 25 via the connection 29 in the direction of feed according to arrow 30.

From there, the plant material enters the shafts or passages 13, which extend between the radial webs 11. These shafts 13 lead, on the inside, into the hollow space 32 of the individual hollow roll 24, 25. The webs 11 are profiled in a defined manner and are provided with channels 23 for the flow of heating media. This causes the plant material to be compressed and heated during its radial passage through the shafts 13, so that curing of the plant material takes place. The compressed and cured pressed body is broken off in the hollow space 32 of the individual hollow roll 24, 25, and it is removed in the axial direction.

Figure 2:
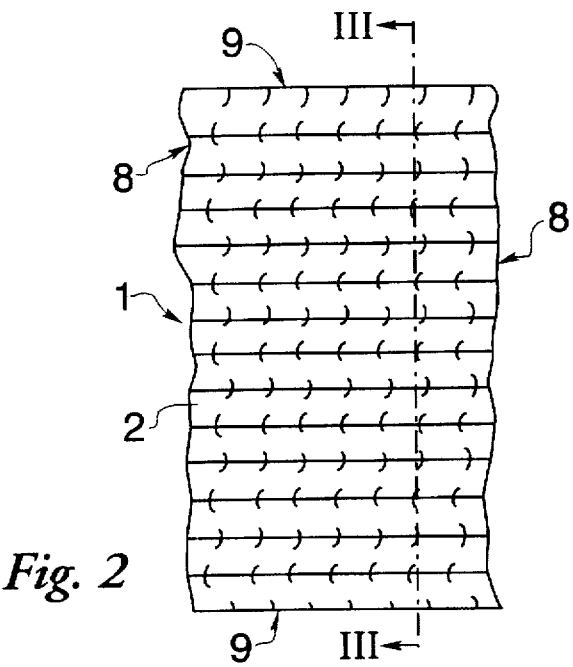
FIG. 2 is a top view of a pressed body provided with a wave-like profiling.
Figure 3:
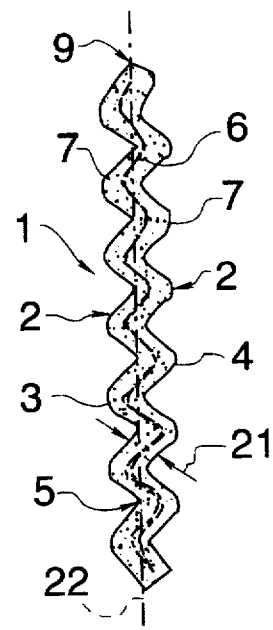
FIG. 3 is a cross section along line III—III through the pressed body according to FIG. 2.

The pressed body 1, which can be prepared with a pelletizing device according to FIG. 1, and whose top view and cross section are shown in FIGS. 2 and 3, has, on both broad lateral sides 2, a wave-like profiling 3, which contains wave peaks 4 and wave valleys 5 extending in parallel to one another in the exemplary embodiment. In between the peaks 4 and valleys 5 are transition areas. This pressed body 1 is formed in its shape as shown by the extrusion of biomass through shafts 13 or pressing channels having a wave-like profile, as are shown in a top view in FIG. 4. The outer broad lateral surfaces 2 and the lateral edge surfaces 9 are correspondingly smooth and hard, whereas the front surfaces or longitudinal ends 8 of the pressed body 1 have an arbitrary line contour, which is determined by the breaking off of sections from an endless strand. The biomass processed is essential grain or cereals, which is harvested in the ripe state and is chopped and pressed directly in the field.

A device as disclosed in FIG. 1 is advantageously used for this purpose.

The inner structure of the pressed body 1 along a rupture line corresponding to the cross section III—III in FIG. 3 is characteristic. If a plane of symmetry 22 through the middle cross section area of the pressed body 1 is imagined, a relatively long-fibered material of the biomass extends along a wavy line around this plane of symmetry 22 in a wavy structure 6. The elevations and depressions of this wavy structure 6 approximately correspond to the wave peaks 4 and wave valleys 5 of the pressed body 1. Differences in height of these elevations and depressions are substantially smaller than those of the wave-like profiling 3 of the pressed body 1. On the other hand, zones 7 of higher density are recognized in the area of the wave peaks 4 and wave valleys 5. This leads to the advantage that the pressed body 1 according to the present invention has a high strength as a consequence of this structure. This is of great significance for the use of the pressed body as fuel, because the amount of abraded material generated during the loading and storage of the pressed bodies is smaller and therefore negligible. In addition, the pressed bodies 1 according to the present invention are relatively resistant to breaking, and they can therefore be prepared in a shape which is particularly advantageous for the subsequent combustion process when used as fuel. It is relevant in this connection that the thickness of the pressed body 1 remains constant along the wave-like profiling. Compared with prior-art pressed bodies, a substantially enlarged surface, which is favorable for the combustion process, is created.

It is, of course, obvious that the shape of the pressed body 1 may also be designed in an alternative manner in terms of its cross-sectional structure. It is not absolutely necessary for the wave peaks 4 and wave valleys 5 to be of a uniform character, as shown in FIG. 3. The pressed body may also be provided with a furrow-like shape, in which the wall thickness is no longer uniform. Therefore, the present invention is not limited to the exemplary embodiment according to FIGS. 2 and 3.

Figure 4:
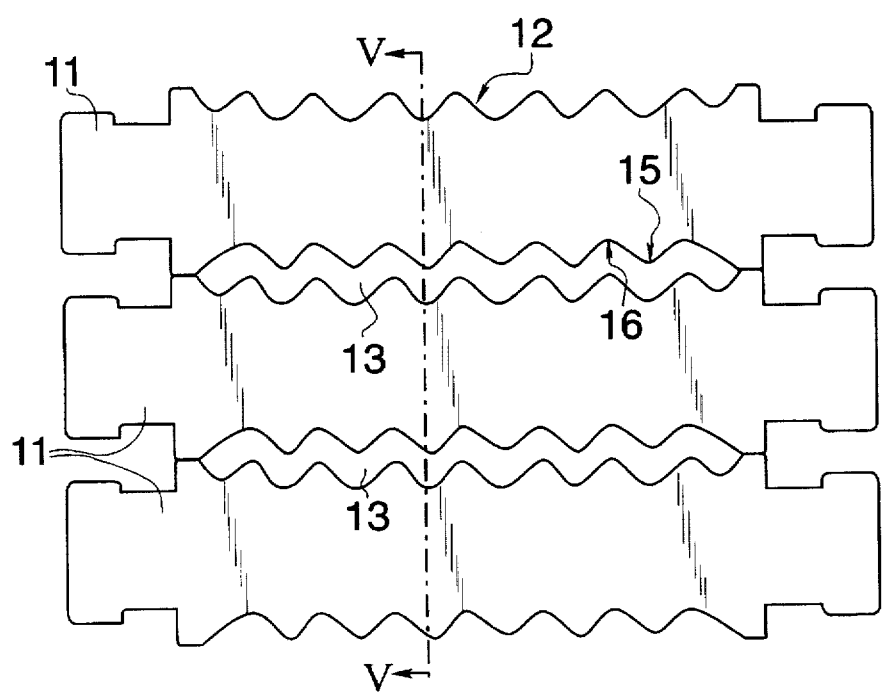
FIG. 4 is a radial top view of three webs of a rotation body with pressing channels formed between them.
Figure 5:
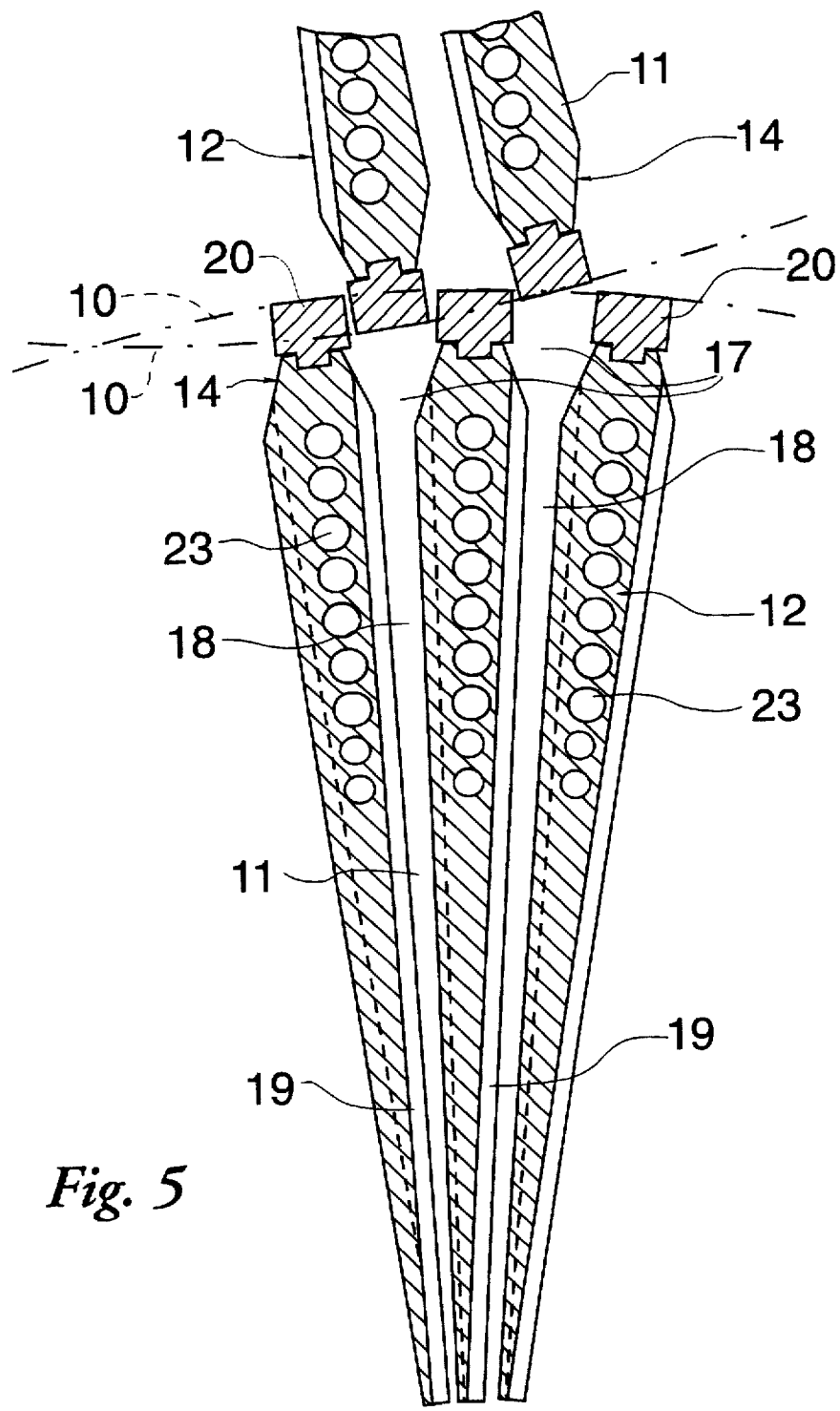
FIG. 5 is a cross section of the webs along line V—V according to FIG. 4.

FIGS. 4 and 5 show the part of a pressing device which causes the formation of the pressed bodies 1 shown in FIGS. 2 and 3. The present invention is based on a device according to FIG. 1.

The arriving chopped material i.e. biomass is introduced into the intake wedge 31 of two hollow rolls 24, 25, which engage each other in the manner of toothed gears, are shown in FIG. 1, and are symbolically indicated in FIG. 5 by dash-dotted contour lines of their wear bars 20. These wear bars 20 always belong to one web 11, a plurality of which are arranged, like teeth of a toothed gear, at equally spaced radial locations from one another and are connected by front-side cheeks to the rotation body 10. Continuous shafts 13 or pressing channels, through which the arriving material of the biomass is pressed during the rotation of the rotation bodies 10, extend in the radial direction between the webs 11. As is shown in FIG. 5, the wear bars 20 engage the tooth spaces located between the wear bars 20 of the other rotation body 10 only relatively slightly, and it is desirable that the wear bars 20 not touch each other.

The lateral surfaces of the webs 11 have a wave-like profiling 12, as is shown in FIG. 4.

This wave-like profiling 12, which corresponds to the wave-like profiling 3 of the pressed bodies 1 according to FIG. 3, also has wave peaks 15 and wave valleys 16, with a wave peak 15 of one web being located opposite a wave valley 16 of an adjacent web. A wavy pressed body 1 of constant wall thickness 21 according to FIG. 3 is thus generated.

In the exemplary embodiment according to FIG. 5, the inside diameter of the shaft 13 or pressing channel is sought to be changed in the radial direction. Thus, the individual shaft 13 is provided in the area of the material intake with a steep wedge-shaped narrowed section 17, which is formed by the bevel 14 of the side walls of the web. An initially loose back-up of the material introduced into the wedge-shaped narrowed section 17 is achieved as a result. This wedge-shaped narrowed section 17 is joined by a section 18 of constant inside diameter of the shaft 13. The cross-sectional shape of the pressed body is formed in this area of the section 18. The individual shaft 13 then has an area 19 slightly expanding in a wedge-shaped manner. The purpose of this measure or feature is to reduce the fraction acting on the pressed body 1 and to enable air and gases to escape. This area 19 slightly expanding in a wedge-shaped manner may comprise approximately half the height of the individual web 17.

Since the webs 11 are arranged radially at spaced locations from one another, the different inside diameter of the shafts 13 or pressing channels is obtained by a stepwise change in the depth of the individual wave valleys 16. The radially inwardly tapering wedge shape of the web 11 may also be changed in a stepwise manner. It is decisive that the material (biomass) to be pressed should first be introduced loosely into the wedge-shaped narrowed section 17, where it has the possibility to become aligned such that the individual fibers will come to lie approximately in parallel to the axis of rotation of the rotation body 24, 25. When this orientation process is completed, the individual strands pass through a section 18 of constant inside diameter of the pressing channel 13. This section 18 forms the shape. Continuous holes 23, through which a heating medium is sent, are provided especially in this area in the individual web 11. This heating medium may be, e.g., the exhaust gas of an internal combustion engine or a harvester.

Figure 6:
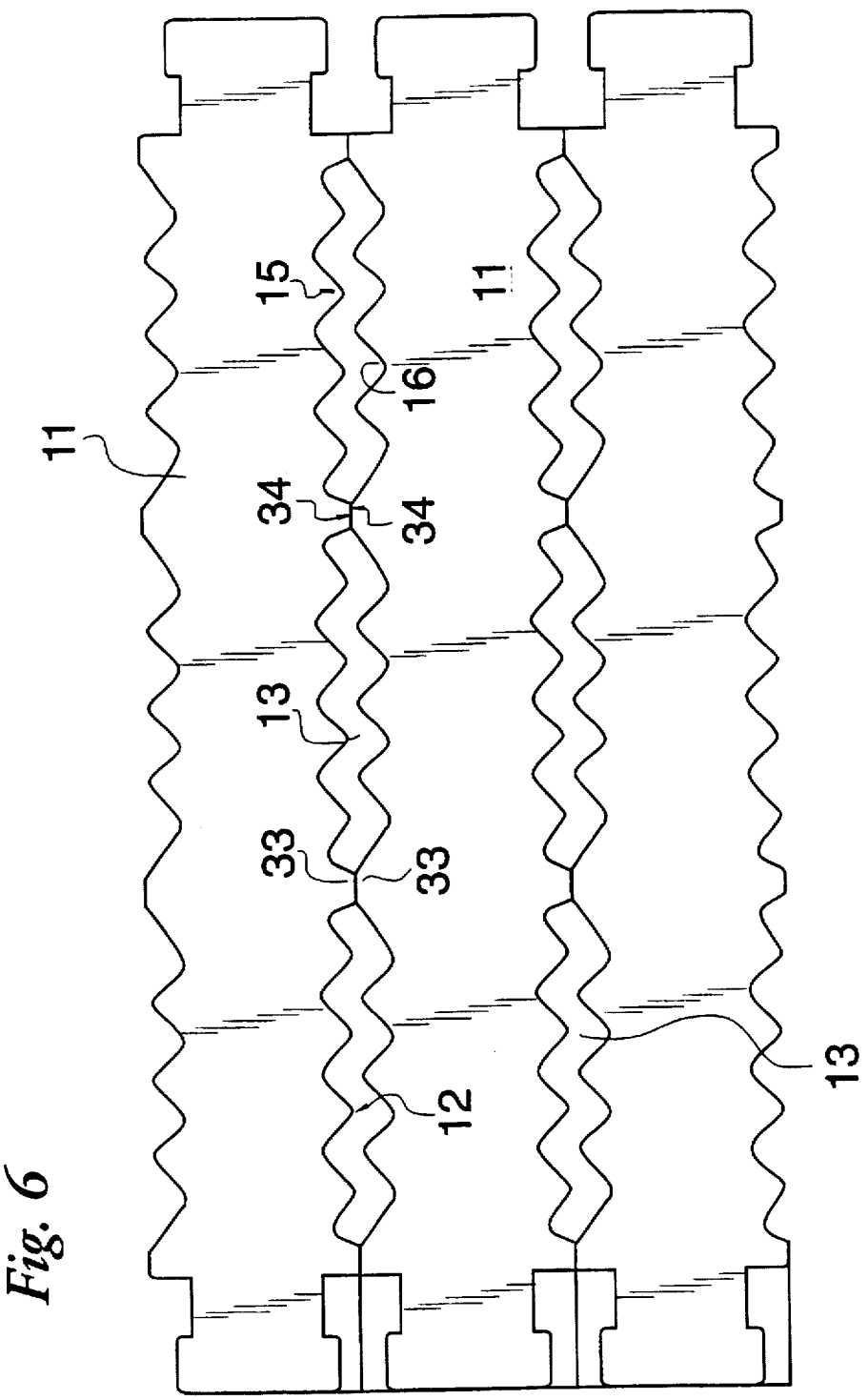
FIG. 6 is a radial top view along arrow VI in FIG. 1.
Figure 7:
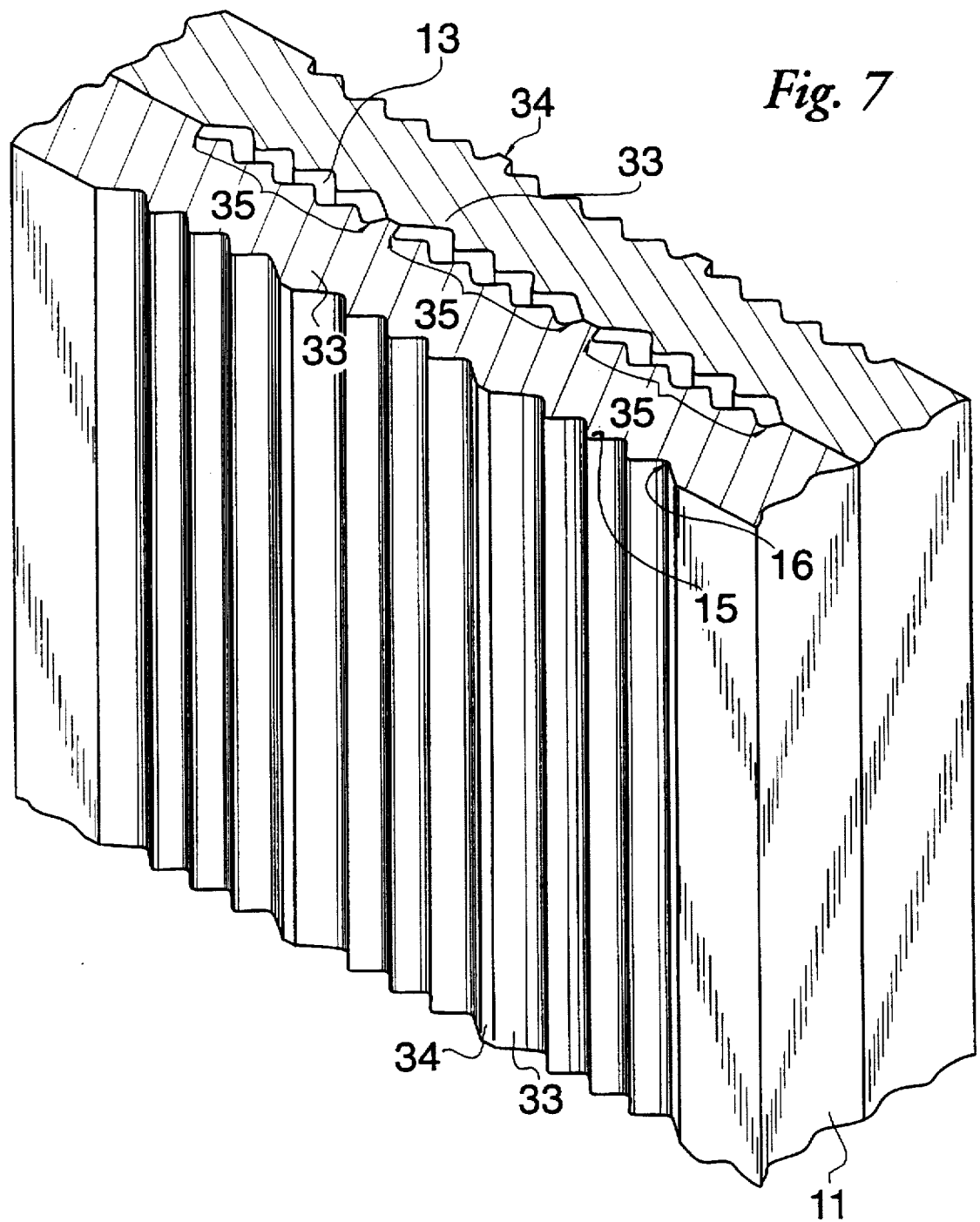
FIG. 7 is a perspective view of a section of two adjacent webs according to FIG. 6.

The individual web 11 has a wave-like profiling 12 on its outer surfaces in the example according to FIG. 6 as well, even though a flat or smooth surface of the webs 11 may also be used in the subject of the invention recognizable from FIG. 6.

To achieve a higher throughput of the harvested material to be pressed per unit of time, the present invention provides for support means including an arrangement of support projections 33, which are designed as radially extending strips within the framework of a preferred exemplary embodiment. The front surfaces 34 of these bars 33 of adjacent webs 11 shall be located next to each other, so that these webs 11 will be supported on these projections 33 (strips). Sections 35 of the individual webs 11 located between the projections 33 or strips are thus spaced from one another. Deflection of the webs 11 is impossible as a consequence of this support, so that uniform dimensioning of the web cross sections is possible in the case of extended webs 11.

The material fed in through the connection 29 according to FIG. 1 is distributed among the webs 11 over a longer section measured in the axial direction, as a consequence of which the stepwise compression and hence the residence time of the plant material in the shafts 13 are changed such that the material to be pressed requires a longer time for passing through the shafts 13. The consequence of this is a more intense curing of the material and hence an improvement in the quality of the pressed bodies prepared.

The outside front surface, the projections 33 have bevels 14 according to FIG. 1, which serve the purpose of uniformly distributing the arriving plant material among the shafts 13.

While specific embodiments of the invention have been shown and described in detail to illustrate the application of the principles of the invention, it will be understood that the invention may be embodied otherwise without departing from such principles.

I claim:

1. A pressed body of compressed plant material prepared by pelletization, the pressed body comprising:
   plant material compressed into a corrugated sheet, said corrugated sheet having a longitudinal axis extending substantially parallel to corrugations in said sheet, said sheet having broad lateral sides with a smooth texture formed by extrusion through correspondingly profiled walls, said sheet having longitudinal ends which are rough and fibrous, said longitudinal ends having fibers extending from said longitudinal ends, said rough and fibrous longitudinal ends being formed by breaking of said corrugated sheet.

2. A pressed body in accordance with claim 1, wherein: said plant material has a relatively long fibered portion positioned substantially half way between said broad lateral sides, said relatively long fibered portion having a wavy structure, an amplitude of said wavy structure being substantially smaller than an amplitude of said corrugations.

3. A pressed body in accordance with claim 1, wherein: said corrugated sheet has valleys and peaks, and has transition areas between said valleys and peaks;
   a density of said plant material in said corrugated sheet varies over a cross section of said corrugated sheet, said density being greater in said peaks and valleys than in said transition areas.

4. A pressed body in accordance with claim 1, wherein: said corrugated sheet has a width of substantially 10 cm, a height of substantially 1.5 cm, and a wall thickness of substantially 0.5 cm.

5. A pressed body in accordance with claim 1, wherein: said plant material is cured ripe cereals.

6. A pressed body in accordance with claim 1, wherein: said plant material is one of hay and cured ripe grain.

7. A pressed body in accordance with claim 1, wherein: said plant material is pelletized.

8. A pressed body comprising:
   biomass material formed into a compressed hard solid corrugated sheet, said corrugated sheet having a longitudinal axis extending substantially parallel to corrugations in said sheet, said sheet having broad lateral sides with a hard smooth texture, said sheet having rough and fibrous longitudinal ends, said longitudinal ends having fibers extending from said longitudinal ends.

9. A pressed body in accordance with claim 8, wherein: said biomass material is cured ripe cereals.

10. A pressed body in accordance with claim 8, wherein: said biomass material is one of hay and cured ripe grain.

11. A pressed body in accordance with claim 8, wherein: said biomass material is pelletized.

12. A pressed body in accordance with claim 8, wherein: said plant material has a relatively long fibered portion positioned substantially half way between said broad lateral sides, said relatively long fibered portion having a wavy structure, an amplitude of said wavy structure being substantially smaller than an amplitude of said corrugations.

13. A pressed body in accordance with claim 8, wherein: said corrugated sheet has valleys and peaks, and has transition areas between said valleys and peaks;
   a density of said plant material in said corrugated sheet varies over a cross section of said corrugated sheet, said density being greater in said peaks and valleys than in said transition areas.

14. A pressed body in accordance with claim 8, wherein: said corrugated sheet has a width of substantially 10 cm, a height of substantially 1.5 cm, and a wall thickness of substantially 0.5 cm.

15. A pelletized body formed by the steps of:
   compressing biomass material to form a compressed solid;
   extruding said compressed solid through corrugated profiled walls to form a hard solid corrugated sheet having broad lateral sides with a hard smooth texture, said sheet having a longitudinal axis extending substantially parallel to corrugations in said sheet;
   breaking said sheet transversely to said longitudinal axis to form longitudinal ends of said sheet which are rough and fibrous, said longitudinal ends having fibers extending from said longitudinal ends.

16. A pelletized body in accordance with claim 15, wherein:
   said biomass material is cured ripe cereals.

17. A pelletized body in accordance with claim 15, wherein:
   said biomass material is one of hay and cured ripe grain.

18. A pelletized body in accordance with claim 15, wherein:
   said biomass material is pelletized.

19. A pressed body in accordance with claim 15, wherein: said biomass material has a relatively long fibered portion positioned substantially half way between said broad lateral sides, said relatively long fibered portion having a wavy structure, an amplitude of said wavy structure being substantially smaller than an amplitude of said corrugations.

20. A pressed body in accordance with claim 15, wherein: said corrugated sheet has valleys and peaks, and has transition areas between said valleys and peaks;
   a density of said biomass material in said corrugated sheet varies over a cross section of said corrugated sheet, said density being greater in said peaks and valleys than in said transition areas.

* * * * *